(12) United States Patent
Ingham et al.

(10) Patent No.: US 9,221,131 B2
(45) Date of Patent: *Dec. 29, 2015

(54) SOLDER ALLOY

(75) Inventors: Anthony E. Ingham, London (GB); Gerard Campbell, Fleet (GB); Brian G. Lewis, Branford, CT (US); Bawa Singh, Voorhees, NJ (US); John P. Laughlin, Tucson, AZ (US); Ranjit Pandher, Plainsboro, NJ (US)

(73) Assignee: Alpha Metals, Inc., South Plainfield, NJ (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/720,578

(22) PCT Filed: Dec. 1, 2005

(86) PCT No.: PCT/GB2005/004609
§ 371 (c)(1),
(2), (4) Date: Jul. 25, 2008

(87) PCT Pub. No.: WO2006/059115
PCT Pub. Date: Jun. 8, 2006

(65) Prior Publication Data
US 2008/0292492 A1    Nov. 27, 2008

Related U.S. Application Data

(60) Provisional application No. 60/710,915, filed on Aug. 24, 2005.

(30) Foreign Application Priority Data

Dec. 1, 2004 (GB) ................................. 0426383.6

(51) Int. Cl.
B23K 35/26 (2006.01)
C22C 1/06 (2006.01)
C22C 13/00 (2006.01)

(52) U.S. Cl.
CPC ................ B23K 35/262 (2013.01); C22C 1/06 (2013.01); C22C 13/00 (2013.01)

(58) Field of Classification Search
CPC ......... B23K 35/262; C22C 1/06; C22C 13/00
USPC ........................... 420/557, 560, 561; 228/56.3
See application file for complete search history.

(56) References Cited

U.S. PATENT DOCUMENTS

| | | | |
|---|---|---|---|
| 4,879,096 A | 11/1989 | Naton | |
| 5,837,191 A * | 11/1998 | Gickler | ........................ 420/560 |
| 5,980,822 A | 11/1999 | Moon et al. | |
| 6,228,322 B1 | 5/2001 | Takeda et al. | |
| 6,365,097 B1 | 4/2002 | Yamashita et al. | |
| 6,554,180 B1 * | 4/2003 | Munekata et al. | ............ 228/224 |
| 6,649,127 B2 | 11/2003 | Habu et al. | |
| 7,282,175 B2 | 10/2007 | Amagai et al. | |
| 2001/0000321 A1 | 4/2001 | Takeda et al. | |
| 2002/0051728 A1 | 5/2002 | Sato et al. | |
| 2003/0015575 A1 | 1/2003 | Yamaguchi et al. | |
| 2007/0036671 A1 | 2/2007 | Albrecht et al. | |

FOREIGN PATENT DOCUMENTS

| | | |
|---|---|---|
| EP | 0336575 | 10/1989 |
| EP | 0855242 | 7/1998 |
| EP | 1245328 | 10/2002 |
| EP | 1273384 | 1/2003 |
| EP | 1468777 A1 * | 10/2004 |
| GB | 2346380 | 8/2000 |
| JP | 10034376 | 2/1998 |
| JP | 2000015476 | 1/2000 |
| JP | 2000280090 | 10/2000 |
| JP | 2003001482 | 1/2003 |
| JP | 2004261863 A * | 9/2004 |
| WO | 2004/096484 A2 | 11/2004 |

OTHER PUBLICATIONS

Amami et al., English machine translation of JP 2004-261863A, Sep. 2004.*
Abstract of JP10034376; Feb. 10, 1998.
International Search Report, PCT/GB2005/004609, dated Mar. 23, 2006, 3 pages.
Abstract of JP2000015476; Jan. 18, 2000.
Abstract of WO2004096484; Nov. 11, 2004.
Abstract of JP2000280090; Oct. 10, 2000.
Abstract of JP2003001482; Jan. 8, 2003.

* cited by examiner

*Primary Examiner* — Roy King
*Assistant Examiner* — Caitlin Kiechle
(74) *Attorney, Agent, or Firm* — Senniger Powers LLP

(57) ABSTRACT

An alloy suitable for use in a wave solder process, reflow soldering process, hot air levelling process or a ball grid array, the alloy comprising from 0.08-3 wt. % bismuth, from 0.15-1.5 wt. % copper, from 0.1-1.5 wt. % silver, from 0-0.1 wt. % phosphorus, from 0-0.1 wt. % germanium, from 0-0.1 wt. % gallium, from 0-0.3 wt. % one or more rare earth elements, from 0-0.3 wt. % indium, from 0-0.3 wt. % magnesium, from 0-0.3 wt. % calcium, from 0-0.3 wt. % silicon, from 0-0.3 wt. % aluminum, from 0-0.3 wt. % zinc, and at least one of the following elements from 0.02-0.3 wt % nickel, from 0.008-0.2 wt % manganese, from 0.01-0.3 wt % cobalt, from 0.01-0.3 wt % chromium, from 0.02-0.3 wt % iron, and from 0.008-0.1 wt % zirconium, and the balance tin, together with unavoidable impurities.

43 Claims, No Drawings

SOLDER ALLOY

The present invention relates to an alloy and, in particular, a lead-free solder alloy. The alloy is particularly, though not exclusively, suitable for use in electronic soldering applications such as wave soldering, reflow soldering, hot air levelling and ball grid arrays and chip scale packages.

For environmental reasons, there is an increasing demand for lead-free replacements for lead-containing conventional alloys. Many conventional solder alloys are based around the tin-copper eutectic composition, Sn-0.7 wt. % Cu. EP-A-0 336 575 describes a low toxicity alloy composition for joining and sealing and, in particular, a lead-free alloy for use as a plumbing solder.

Wave soldering (or flow soldering) is a widely used method of mass soldering electronic assemblies. It may be used, for example, for through-hole circuit boards, where the board is passed over a wave of molten solder, which laps against the bottom of the board to wet the metals surfaces to be joined.

Another soldering process involves immersing printed wiring boards into molten solder in order to coat the copper terminations with a solderable protective layer. This process is known as hot air levelling.

A ball grid array joint or chip scale package is assembled typically with spheres of solder between two substrates. Arrays of these joints are used to mount chips on circuit boards.

US 2002/0051728 relates to a solder ball for use in a bump connection in a semiconductor device. Lead-containing and lead-free solder alloy compositions are described. An example is provided of a lead-free solder alloy having the composition Sn-2.5Ag-0.5Cu-1Bi.

However, problems are associated with some conventional lead-free eutectic or near eutectic solder compositions when used in wave soldering, reflow soldering, hot air levelling processes and ball grid arrays. In particular, conventional solder alloys in wave soldering often require high operating temperatures in order to obtain adequate soldering results without substantial faults on the board, such as webbing and bridging of solder between component terminations. The high temperatures used increase the rate of dross formation and the likelihood of excessive warping of the printed wiring board.

There are a number of requirements for a solder alloy to be suitable for use in wave soldering, reflow soldering, hot air levelling processes and ball grid arrays. First, the alloy must exhibit good wetting characteristics in relation to a variety of substrate materials such as copper, nickel, nickel phosphorus ("electroless nickel"). Such substrates may be coated to improve wetting, for example by using tin alloys, gold or organic coatings (OSP). Good wetting also enhances the ability of the molten solder to flow into a capillary gap, and to climb up the walls of a through-plated hole in a printed wiring board, to thereby achieve good hole filling.

Solder alloys tend to dissolve the substrate and to form an intermetallic compound at the interface with the substrate. For example, tin in the solder alloy may react with the substrate at the interface to form an inter metallic compound layer. If the substrate is copper, then a layer of $Cu_6Sn_5$ will be formed. Such a layer typically has a thickness of from a fraction of a micron to a few microns. At the interface between this layer and the copper substrate an intermetallic compound of $Cu_3Sn$ may be present. The interface intermetallic layers will tend to grow during aging, particularly where the service is at higher temperatures, and the thicker intermetallic layers, together with any voids that may have developed may further contribute to premature fracture of a stressed joint.

Other important factors are: (i) the presence of intermetallics in the alloy itself, which results in improved mechanical properties; (ii) oxidation resistance, which is important in solder spheres where deterioration during storage or during repeated reflows may cause the soldering performance to become less than ideal; (iii) drossing rate; and (iv) alloy stability. These latter considerations are important for applications where the alloy is held in a tank or bath for long periods of time.

The present invention aims to address at least some of the problems associated with the prior art and to provide an improved solder alloy. Accordingly, the present invention provides an alloy suitable for use in a wave solder process, a reflow soldering process, hot air levelling process, a ball grid array or chip scale package, the alloy comprising from 0.08-3 wt. % bismuth,
from 0.15-1.5 wt. % copper,
from 0.1-1.5 wt. % silver,
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % magnesium,
from 0-0.3 wt. % calcium,
from 0-0.3 wt. % silicon,
from 0-0.3 wt. % aluminium,
from 0-0.3 wt. % zinc,
and at least one of the following elements
from 0.02-0.3 wt % nickel,
from 0.008-0.2 wt % manganese,
from 0.01-0.3 wt % cobalt,
from 0.01-0.3 wt % chromium,
from 0.02-0.3 wt % iron,
from 0.008-0.1 wt % zirconium,
and the balance tin, together with unavoidable impurities.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The presence of bismuth provides strengthening of the alloy via its presence in solid solution at low concentration levels, and as bismuth rich particles or bismuth containing intermetallics at higher levels. Its presence improves the mechanical properties of the solder alloy for the applications in question, i.e. wave soldering, reflow soldering, hot air levelling, ball grid arrays and chip scale packages. The bismuth content also contributes to the reduction in the growth rate of Cu—Sn intermetallics at the interface which leads to improved mechanical properties of the solder joints made using the alloys. For this reason, the alloy according to the present invention preferably comprises from 0.08 to 1 wt. % Bi, more preferably from 0.08 to 0.5 wt. % Bi, still more preferably from 0.08 to 0.3 wt. % Bi, still more preferably from 0.08 to 0.2 wt. % Bi. A useful lower limit is considered to be 0.08 wt %, and for this reason the lower limit in respect of the bismuth is typically 0.1 wt. %, more typically 0.12 wt. % or 0.14 wt. %. However, the content of bismuth in the alloy does not exceed 3 wt %. Higher levels of bismuth lower the melting point and reduce the ductility of the alloy, for example making fabrication into wire much more difficult. For these reasons, the content of bismuth in the alloy preferably does not exceed 1 wt %, more preferably it does not exceed 0.5 wt. %, more preferably it does not exceed 0.4 wt. %, still more preferably it does not exceed 0.3 wt. %. In view of the foregoing, in a preferred embodiment, the present invention provides an alloy as described herein and which contains from 0.10-0.3 wt % Bi, more preferably 0.12-0.3 wt % Bi.

The alloy preferably comprises from 0.15 to 1 wt. % Cu, more preferably from 0.5 to 0.9 wt. % Cu, still more preferably from 0.6 to 0.8 wt. % Cu.

The alloy preferably comprises from 0.1 to 1.3 wt. % Ag, more preferably from 0.1 to 1 wt. % Ag, still more preferably from 0.1 to 0.5 wt. % Ag, still more preferably from 0.1 to 0.4 wt. % Ag, still more preferably from 0.2 to 0.4 wt. % Ag. In combination with the other alloying elements, a silver content within these ranges has been found to provide the alloy with the necessary properties for the applications in question. Furthermore, it has been found that molten alloys with lower silver content have the advantage of producing lower copper dissolution rates. For this reason, the content of silver in the alloy preferably does not exceed 1.1 wt. %, more preferably it does not exceed 0.5 wt. %, still more preferably it does not exceed 0.4 wt. %.

Copper forms an eutectic with tin, lowering the melting point and increasing the alloy strength. A copper content in the hyper-eutectic range increases the liquidus temperature but further enhances the alloy strength. Silver further lowers the melting point and improves the wetting properties of the solder to copper and other substrates. Bismuth also improves the alloy strength and, depending on the concentration chosen, will reduce the melting point still further.

The alloy preferably comprises from 0.02-0.2 wt. % of at least one of nickel, cobalt, iron and chromium, more preferably from 0.02-0.1 wt. % of at least one of nickel, cobalt, iron and chromium.

If present, the alloy preferably comprises from 0.005-0.3 wt. % magnesium. Improved properties can be obtained by the presence of from 0.02-0.3 wt % Fe in conjunction with from 0.005-0.3 wt. % magnesium.

If present, the alloy preferably comprises from 0.01-0.15 wt % manganese, more preferably from 0.02-0.1 wt % manganese.

Nickel, cobalt, chromium, manganese and zirconium may act as intermetallic compound growth modifiers and grain refiners. For example, while not wishing to be bound by theory, it is believed that nickel forms an intermetallic with tin and substitutes for the copper to form a CuNiSn intermetallic. Nickel may also form an intermetallic with bismuth. The presence of nickel in the alloy has been found to have an advantageous effect in that it reduces the dissolution rate of the thin copper layers on printed circuit boards. In some cases, where there are large areas of bare copper being wetted by the solder, this attribute is helpful to maintain the stability of the solder composition and prevent undue build-up of the copper level. This has particular value in, for example, hot air solder levelling since the potential for problems being caused by the change in the solder bath composition (for example an increase in the copper level) are reduced. For these reasons, the alloy according to the present invention preferably comprises at least 0.03 wt. % Ni, for example from 0.03 wt. % to 0.3 wt. % Ni.

If the service conditions limit the maximum temperature, and there is a need for the molten alloy to have good flow properties though holes or in capillary gaps, then it advantageous if the nickel level does not exceed 0.1 wt. %, more preferably if it does not exceed 0.06 wt. %. Accordingly, in one preferred embodiment, the present invention provides an alloy as herein described and which contains from 0.03-0.1 wt % Ni, more preferably from 0.03-0.06 wt % Ni.

On the other hand, where maximum effects from grain refinement and strength are desirable and can be accommodated by higher operating temperatures, then the alloy preferably contains at least 0.05 wt. % Ni, more preferably at least 0.07 wt. % Ni, still more preferably at least 0.1 wt. % Ni. Accordingly, in another preferred embodiment, the present invention provides an alloy as herein described and which contains from 0.05-0.3 wt % Ni, more preferably from 0.07-0.3 wt % Ni, still more preferably from 0.1-0.3 wt % Ni.

Furthermore the presence of nickel in the low silver and bismuth containing alloy provides a great practical benefit in improving the resistance to so called "drop shock" failure (brittle fracture) of a ball grid array or chip scale package made with these solders in form of a sphere, or a solder paste. This benefit is believed to be derived from the reduced growth rate of the intermetallics at the interface between solder and substrate caused by thermal aging which occurs during service. It has been found that the growth rates of the copper—solder interface intermetallics are less than in nickel free alloys of the Sn—Ag—Cu—Bi system.

Iron is believed to have a similar effect to nickel and the comments above in relation to nickel are therefore also applicable to iron. For the reasons outlined above, the alloy preferably comprises at least 0.03 wt. % Fe, for example from 0.03 wt. % to 0.3 wt. % Fe.

Manganese, cobalt and chromium each have low solubility in tin and are also believed to form intermetallics with copper and tin. Chromium has some solubility in copper and therefore has the potential to substitute for copper in Cu—Sn intermetallics in the same manner as nickel. The presence of the intermetallics affects the microstructure developed on cooling the alloy from the molten to the solid state. A finer grain structure is observed, which further benefits the appearance and strength of the alloy.

Cobalt has also been found to reduce the rate of dissolution of copper and to slow the rate of interface intermetallic formation, while not having an adverse effect on the solder wetting speed. For this reason, the alloy preferably comprises at least 0.02 wt. % Co, more preferably at least 0.05 wt. % Co, more preferably at least 0.07 wt. % Co, still more preferably at least 0.1 wt. % Co. However, if the service conditions limit the maximum temperature, and there is a need for the molten alloy to have good flow properties though holes or in capillary gaps, then it may be preferable if the cobalt level does not exceed 0.1 wt. %, more preferably if it does not exceed 0.07 wt. %. Accordingly, in one preferred embodiment, the present invention provides an alloy as herein described and which contains from 0.02-0.07 wt. % Co, more preferably from 0.02-0.05 wt % Co. The presence of Co provides a similar benefit to that of Ni when it is used in the composition in combination with the other elements of the invention as a solder in ball grid arrays and chip scale packaging. Drop shock failure resistance is enhanced.

Chromium has also been found to harden the alloy. Accordingly, for certain applications where it is desired to avoid a brittle alloy, it is preferable if the chromium content in the alloy does not exceed 0.2 wt. %, more preferably if the chromium content does not exceed 0.1 wt. %. A preferred range is from 0.02 to 0.1 wt. % Cr, more preferably from 0.02 to 0.08 wt. % Cr, still more preferably from 0.02 to 0.06 wt. % Cr.

The present inventors have also found that the presence of chromium in the alloy has a considerable benefit in the ability to reduce the rate of oxidation of spheres of solder. Accordingly, for certain applications, it may be preferable if the alloy comprises at least 0.02 wt. % Cr, preferably at least 0.05 wt. % Cr, more preferably at least 0.06 wt. % Cr, still more preferably at least 0.07 wt. % Cr. In one preferred embodiment, the present invention provides a solder sphere comprising an alloy as herein described and which contains from 0.02-0.3 wt. % Cr, more preferably from 0.05-0.3 wt. % Cr, still more preferably from 0.07-0.3 wt. % Cr.

Both zirconium and manganese have been found to reduce the rate of interface intermetallic growth.

Indium, zinc and aluminium may act as diffusion modifiers. Indium has been found to have a beneficial effect on solder wetting. Indium lowers the melting point of the solder. Indium may also act to reduce the formation of voids in the solder joint. Indium may also improve the strength of the Sn-rich matrix. Zinc has been found to act in a similar manner to indium.

Aluminium and magnesium have been found to alter the shape of the intermetallic phases present in the bulk alloy, providing a benefit in some production applications where alloy must pass through narrow nozzles without blockage caused by build up of unmelted intermetallic in the entry zone of the nozzle.

Phosphorus, germanium and gallium may act to reduce the volume of dross formed on the top of an open tank of solder, and are thus valuable additions in, for example, wave solder baths.

If present, the alloy preferably comprises up to 0.05 wt. % of one or more rare earth elements. The one or more rare earth elements preferably comprise two or more elements selected from cerium, lanthanum, neodymium and praseodymium.

The alloys will typically comprise at least 90 wt. % tin, preferably from 94 to 99.6% tin, more preferably from 95 to 99% tin, still more preferably 97 to 99% tin. Accordingly, the present invention further provides an alloy for use in a wave solder process, reflow soldering process, hot air levelling process, a ball grid array or chip scale package, the alloy comprising
   from 0.08-3 wt. % bismuth,
   from 0.15-1.5 wt. % copper,
   from 0.1-1.5 wt. % silver,
   from 95-99 wt % tin,
   from 0-0.1 wt. % phosphorus,
   from 0-0.1 wt. % germanium,
   from 0-0.1 wt. % gallium,
   from 0-0.3 wt. % of one or more rare earth elements,
   from 0-0.3 wt. % indium,
   from 0-0.3 wt. % magnesium,
   from 0-0.3 wt. % calcium,
   from 0-0.3 wt. % silicon,
   from 0-0.3 wt. % aluminium,
   from 0-0.3 wt. % zinc,
and at least one of the following elements
   from 0.02-0.3 wt % nickel,
   from 0.008-0.2 wt % manganese,
   from 0.01-0.3 wt % cobalt,
   from 0.01-0.3 wt % chromium,
   from 0.02-0.3 wt % iron, and
   from 0.008-0.1 wt % zirconium,
together with unavoidable impurities.

The alloys according to the present invention may consist essentially of the recited elements. It will therefore be appreciated that in addition to those elements which are mandatory (i.e. Sn, Cu, Bi, Ag and at least one of Ni, Co, Mn, Fe, Zr and Cr) other non-specified elements may be present in the composition provided that the essential characteristics of the composition are not materially affected by their presence. Accordingly, the present invention still further provides an alloy for use in a wave solder process, reflow soldering process, hot air levelling process, a ball grid array or chip scale package, the alloy consisting essentially of:
   from 0.08-3 wt. % bismuth,
   from 0.15-1.5 wt. % copper,
   from 0.1-1.5 wt. % silver,
   from 95-99 wt % tin,
   from 0-0.1 wt. % phosphorus,
   from 0-0.1 wt. % germanium,
   from 0-0.1 wt. % gallium,
   from 0-0.3 wt. % of one or more rare earth elements,
   from 0-0.3 wt. % indium,
   from 0-0.3 wt. % magnesium,
   from 0-0.3 wt. % calcium,
   from 0-0.3 wt. % silicon,
   from 0-0.3 wt. % aluminium,
   from 0-0.3 wt. % zinc,
and at least one of the following elements
   from 0.02-0.3 wt % nickel,
   from 0.008-0.2 wt % manganese,
   from 0.01-0.3 wt % cobalt,
   from 0.01-0.3 wt % chromium,
   from 0.02-0.3 wt % iron, and
   from 0.008-0.1 wt % zirconium,
together with unavoidable impurities.

The present invention also provides for the use of the following solder alloy composition in a ball grid array or chip scale package:
   from 0.08-3 wt. % bismuth,
   from 0.15-1.5 wt. % copper,
   from 0.1-1.5 wt. % silver,
   from 0-0.1 wt. % phosphorus,
   from 0-0.1 wt. % germanium,
   from 0-0.1 wt. % gallium,
   from 0-0.3 wt. % of one or more rare earth elements,
   from 0-0.3 wt. % indium,
   from 0-0.3 wt. % magnesium,
   from 0-0.3 wt. % calcium,
   from 0-0.3 wt. % silicon,
   from 0-0.3 wt. % aluminium,
   from 0-0.3 wt. % zinc,
and the balance tin, together with unavoidable impurities. The present invention also provides for a ball grid array joint comprising the above solder alloy composition.

The alloys according to the present invention are lead-free or essentially lead-free. The alloys offer environmental advantages over conventional lead-containing solder alloys.

The alloys according to the present invention will typically be supplied as a bar, stick or ingot, optionally together with a flux. The alloys may also be provided in the form of a wire, for example a cored wire, which incorporates a flux, a sphere, or other preform typically though not necessarily made by cutting or stamping from a strip or solder. These may be alloy only or coated with a suitable flux as required by the soldering process. The alloys may also be supplied as a powder, or as a powder blended with a flux to produce a solder paste.

The alloys according to the present invention may be used in molten solder baths as a means to solder together two or more substrates and/or for coating a substrate.

It will be appreciated that the alloys according to the present invention may contain unavoidable impurities, although, in total, these are unlikely to exceed 1 wt. % of the composition. Preferably, the alloys contain unavoidable impurities in an amount of not more than 0.5 wt. % of the composition, more preferably not more than 0.3 wt. % of the composition, still more preferably not more than 0.1 wt. % of the composition.

The alloys according to the present invention are particularly well suited to applications involving wave soldering, reflow soldering, hot air levelling or ball grid arrays and chip scale packaging. The alloys according to the present invention may also find application in non-electronic applications such as, for example, plumbing and automotive radiators.

EXAMPLES

The following are non-limiting examples to further describe the present invention.

Example 1

An alloy was prepared by melting Sn in a cast iron crucible (alternatively a ceramic crucible can be used). To the molten Sn was added an alloy of Sn-3 wt % Cu, elemental Bi, and alloys of Sn-5 wt % Ag and Sn-0.6 wt % Ni. These additions were made with the alloy bath temperature at 350° C. The bath was cooled to 300° C. for the addition of phosphorus in the form of an alloy Sn-0.3% P.

The alloy was sampled to verify the composition of

| | |
|---|---|
| Ag | 0.3 wt % |
| Cu | 0.7 wt % |
| Bi | 0.12 wt % |
| Ni | 0.04 wt % |
| P | 0.005 wt %. |
| | and remainder tin |

The alloy was cast into an ingot. It was later re-melted into a solder bath serving a wave soldering machine. The molten alloy at a bath temperature of 260° C. was pumped to produce two solder waves close to each other.

The machine was used to produce joints between components and the board terminations on a range of single and double sided printed circuit boards. Incidence of faults requiring repair was very low and the surface of the soldered joints was attractively bright and readily inspected.

Example 2

The alloy according to Example 1 may also be used in a hot air solder levelling bath. The temperature is set at 260° C., and the machine set so that contact times with the solder boards ranged from 2.5 seconds at the top of the PCB boards and 5 seconds at the base of the board. Air knife temperatures were 295 C. Excellent tinning results were achieved with clean surface finish and consistent tinning thickness.

Example 3

The following alloy composition was prepared (all wt. %).

| | |
|---|---|
| Ag | 0.3 |
| Cu | 0.6 |
| Bi | 0.13 |
| Ni | 0.03 |
| Co | 0.02 |
| P | 0.004 |
| Sn | balance |

This alloy was prepared in a similar manner to example 1. Cobalt was added in the form of a master alloy of Sn-0.3 wt % Co. The solder was loaded into a wave solder bath, melted, and the temperature set at 260° C. Solder boards were fluxed with AlphaFry EF6000 flux, and the boards then wave soldered. Joints were formed cleanly, the level of bridging was low, and the hole fill was excellent.

Example 4

The following alloy composition was prepared in a similar manner to Example 1 (all wt. %).

| | |
|---|---|
| Ag | 0.34 |
| Cu | 0.72 |
| Bi | 0.25 |
| Ni | 0.03 |
| P | 0.003 |
| Sn | balance |

This alloy may also be used in a wave solder bath. Double sided FR4 test boards containing a large connector block, Quad flat pack IC's with a range of lead pitches, SOT 23 and chip resistors and capacitors were fluxed with AlphaFry flux EF6000 and passed over wave at 260° C. Good soldering results were obtained on a deliberately challenging board layout with minimal bridging and skips present.

Example 5

Alloys have been prepared corresponding to the compositions of Examples 2 to 5 where Ge at 0.007 wt. % is substituted for the phosphorus content.

Example 6

The following alloy composition was prepared in a similar manner to Example 1 (all wt. %).

| | |
|---|---|
| Ag | 0.35 |
| Cu | 0.65 |
| Bi | 0.14 |
| Co | 0.20 |
| P | 0.005% |
| Sn | balance |

This alloy may be provided in the form of a sphere and used in a ball grid array or chip scale package joint.

Example 7

The following alloy composition was prepared in a similar manner to Example 1 (all wt. %).

| | |
|---|---|
| Ag | 0.35 |
| Cu | 0.7 |
| Bi | 0.13 |
| Co | 0.10 |
| Ge | 0.10 |
| Sn | balance |

This alloy may be provided in the form of a sphere and used in a ball grid array or chip scale package joint.

Example 8

The following alloy composition was prepared in a similar manner to Example 1 (all wt. %).

| | | |
|---|---|---|
| Ag | 1.1 | |
| Cu | 1.1 | |
| Bi | 0.15 | |
| Ni | 0.06 | |
| Co | 0.02% | |
| Sn | balance | |

This alloy may be provided in the form of a preform or sphere.

Example 9

The following alloy composition was prepared in a similar manner to Example 1. Germanium was provide by manufacture of a master alloy of Sn-0.3% Ge.

| | |
|---|---|
| Ag | 0.3 |
| Cu | 0.7 |
| Bi | 0.1 |
| Ni | 0.10 |
| Ge | 0.10 |
| P | 0.006 |
| Sn | balance |

This alloy may be provided in the form of a sphere and used in a ball grid array joint or chip scale package.

Example 10

The alloy composition according to Example 9 was punched into a disc, which was then melted and spherodised as a sphere.

Example 11

The following alloy composition was prepared in a similar manner to Example 1 (all wt. %).

| | |
|---|---|
| Ag | 0.4 |
| Cu | 0.6 |
| Bi | 0.14 |
| Ni | 0.05 |
| In | 0.15 |
| Ge | 0.005% |
| Sn | balance |

This alloy may be provided in the form of a sphere.

Example 12

The following alloy composition was prepared in a similar manner to Example 1 (all wt. %). A tin chromium master alloy containing 0.25% Cr had been prepared in a vacuum furnace.

| | |
|---|---|
| Ag | 0.3 |
| Cu | 0.65 |
| Bi | 0.12 |
| Cr | 0.05 |
| P | 0.006 |
| Sn | balance |

This alloy may be provided in the form of a sphere.

Example 13

The following alloy composition was prepared in a similar manner to Example 1 (all wt. %).

| | |
|---|---|
| Ag | 0.3 |
| Cu | 0.7 |
| Bi | 0.1 |
| Ni | 0.2 |
| P | 0.006 |
| Sn | balance |

This alloy may be provided in the form of a sphere and used in a ball grid array or chip scale package joint.

Example 14

The following alloy composition was prepared by melting the elements in a vacuum furnace.

| | |
|---|---|
| Ag | 1.1 |
| Cu | 1.1 |
| Bi | 0.1 |
| Fe | 0.25 |
| Mg | 0.01 |
| Sn | balance |

This alloy may be provided in the form of a sphere and used in a ball grid array joint.

Example 15

Ten BGA packages, each individually daisy chained, were prepared by reflow soldering using solder spheres of the following alloy compositions.

| | | |
|---|---|---|
| A | Ag | 3.0 wt % |
| | Cu | 0.5 wt % |
| | Sn | remainder |
| B | Ag | 0.3 wt % |
| | Cu | 0.7 wt % |
| | Bi | 0.1 wt % |
| | Sn | remainder |
| C | Ag | 0.3 wt % |
| | Cu | 0.7 wt % |
| | Bi | 0.1 wt % |
| | Ni | 0.05 wt % |
| | Sn | remainder |

They were each subjected to 1500 g shock pulses of 0.5 milli second duration to simulate drop shock impact stress loading. At all stages the assemblies were monitored to track the condition of the solder joints using a 64 channel on line resistance monitor so that failure due to resistance change could be established.

The shocks were repeated and the incidence of failed joints was recorded.

After only 3 shocks loadings, 10% of the Sn-3.0Ag-0.5Cu joints had failed, whereas those made in alloy B survived to 50 drops, and in alloy C to 120 drops before the same incidence of failure was recorded.

A 25% failure rate was found in alloy A after 8 drops, in alloy B after 100 drops, and alloy C survived 200 drops.

This improved resistance to brittle drop shock failure is of considerable practical value.

Example 16

An alloy was prepared by melting Sn in a cast iron crucible (alternatively a ceramic crucible can be used). To the molten Sn was added an alloy of Sn-3 wt % Cu, and alloys of Sn-5 wt % Ag and Sn-0.35 wt % Ni. These additions were made with the alloy bath temperature at 350° C. The bath was cooled to 300° C. for the addition of phosphorus in the form of an alloy Sn-0.3% P.

The alloy was sampled to verify the composition of

| | |
|---|---|
| Ag | 0.3 wt % |
| Cu | 0.7 wt % |
| Bi | 0.1 wt % |
| P | 0.006 wt %. |
| | and remainder tin |

The alloy composition was then jetted as a metal stream into an inerted vertical column. The metal stream was spherodised by the application of magnetostrictive vibrational energy applied through the melt pot and at or near the exit orifice.

Equally, the alloy composition could be punched and then spherodised as a sphere.

The alloy, provided in the form of a sphere can be used in a ball grid array joint. Flux is printed or pin transferred to the pads of a CSP. The spheres are then pick and placed or shaken through a stencil onto the fluxed pads. The package is then reflowed in a standard reflow oven at a peak temperature of between 240° C. and 260° C.

Alloy and solder joint performance was assessed in packages aged at 150° C. for up to 1000 hours. IMC growth was measured by standard metallographic techniques. Mechanical ball pull testing was used to assess solder joint failure mode (brittle or ductile).

The invention claimed is:

1. A lead-free alloy for use in an application selected from the applications consisting of a wave solder process, a reflow soldering process, a hot air levelling process, a ball grid array, and a chip scale package, the alloy comprising:
   from 0.5-1.5 wt % copper,
   from 0.1-1.1 wt. % silver;
   from 0.02-0.3 wt % nickel;
   wherein the alloy contains Bi and the Bi content does not exceed 1 wt %;
   and optionally one or more of
   from 0.02-0.3 wt % iron
   from 0-0.1 wt. % phosphorus,
   from 0-0.1 wt. % germanium,
   from 0-0.1 wt. % gallium,
   from 0-0.3 wt. % of one or more rare earth elements,
   from 0-0.3 wt. % indium,
   from 0-0.3 wt. % magnesium,
   from 0-0.3 wt. % calcium,
   from 0-0.3 wt. % silicon,
   from 0-0.3 wt. % aluminium,
   from 0-0.3 wt. % zinc,
   from 0.008-0.2 wt % manganese,
   from 0.01-0.3 wt % cobalt,
   from 0.01-0.3 wt % chromium, and
   from 0.008-0.1 wt % zirconium;
   and balance of tin, together with unavoidable impurities.

2. The lead-free alloy of claim 1 comprising:
   from 0.08-1 wt. % bismuth.

3. The alloy of claim 2 comprising from 0.08 to 0.5 wt. % Bi.

4. The alloy of claim 2 comprising from 0.08 to 0.3 wt. % Bi.

5. The alloy of claim 2 comprising from 0.6 to 0.8 wt. % Cu.

6. The alloy of claim 2 comprising from 0.5 to 0.9 wt. % Cu.

7. The alloy of claim 2 comprising from 0.1 to 1 wt. % Ag.

8. The alloy of claim 2 comprising from 0.1 to 0.5 wt. % Ag.

9. The alloy of claim 2 comprising from 0.02 to 0.2 wt. % Ni.

10. The alloy of claim 2 comprising from 0.02 to 0.1 wt. % Ni.

11. The alloy of claim 2 comprising from 0.02 to 0.2 wt. % of the element selected from the group consisting of Co, Cr, and combinations thereof.

12. The alloy of claim 2 comprising from 0.02 to 0.1 wt. % of the element selected from the group consisting of Co, Cr, and combinations thereof.

13. The alloy of claim 2 comprising from 0.03 to 0.3 wt. % Ni.

14. The alloy of claim 2 comprising from 0.03 to 0.1 wt. % Ni.

15. The alloy of claim 2 comprising from 0.03 to 0.06 wt % Ni.

16. The alloy of claim 2 comprising from 0.05 to 0.3 wt % Ni.

17. The alloy of claim 2 comprising from 0.07 to 0.3 wt % Ni.

18. The alloy of claim 2 comprising from 0.02 to 0.07 wt. % Co.

19. The alloy of claim 2 comprising from 0.02 to 0.05 wt % Co.

20. The alloy of claim 2 comprising from 0.02 to 0.08 wt. % Cr.

21. The alloy of claim 2 comprising from 0.02 to 0.06 wt. % Cr.

22. The alloy of claim 2 comprising from 0.02 to 0.3 wt. % Cr.

23. The alloy of claim 2 comprising from 0.05 to 0.3 wt. % Cr.

24. The alloy of claim 2 comprising from 0.02 to 0.1 wt % Fe.

25. The alloy of claim 2 comprising from 0.01 to 0.15 wt. % Mn.

26. The alloy of claim 2 comprising from 0.05 to 0.3 wt. % In.

27. The alloy of claim 2 comprising the following:
   from 0.08-1 wt. % bismuth,
   from 0.5-1.5 wt. % copper,
   from 0.1-1.1 wt. % silver;
   from 0.02-0.3 wt % nickel;
   from 0.01 to 0.3 wt. % Si.

28. The alloy of claim 2 comprising the following:
   from 0.08-1 wt. % bismuth,
   from 0.5-1.5 wt. % copper,
   from 0.1-1.1 wt. % silver;
   from 0.02-0.3 wt % nickel;
   from 0.008 to 0.3 wt. % Al.

29. The alloy of claim 2 comprising from 0.01 to 0.3 wt. % Zn.

30. The alloy of claim 2 comprising approximately 0.3 wt. % Ag, approximately 0.7 wt. % Cu, approximately 0.1 wt. % Bi, up to 0.1 wt. % Ni, and approximately 0.006 wt. % P.

31. The alloy of claim 2 comprising approximately 0.3 wt. % Ag, approximately 0.7 wt. % Cu, approximately 0.1 wt. % Bi, up to 0.1 wt. % Ni, and from 0.005 to 0.015 wt % Ge.

32. The alloy of claim 2 in a form selected from the group consisting of a bar, a stick, a solid wire, a flux cored wire, a foil, a strip, a powder, a paste of a blend of powder and flux, solder spheres for use in ball grid array joints, solder spheres for use in chip scale packages, and pre-formed solder pieces.

33. A soldered joint comprising the alloy of claim 2.

34. The alloy of claim 2 consisting essentially of:
   from 0.08-1 wt. % bismuth,
   from 0.5-1.5 wt. % copper, from 0.1-1.1 wt. % silver;
from 0.02-0.3 wt % nickel;
and optionally one or more of
from 0.02-0.3 wt % iron,
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % magnesium,
from 0-0.3 wt. % calcium,
from 0-0.3 wt. % silicon,
from 0-0.3 wt. % aluminium,
from 0-0.3 wt. % zinc,
from 0.008-0.2 wt % manganese,
from 0.01-0.3 wt % cobalt,
from 0.01-0.3 wt % chromium, and
from 0.008-0.1 wt % zirconium;
and balance of tin, together with unavoidable impurities.

35. The alloy of claim 2 consisting essentially of:
from 0.08-0.5 wt. % bismuth,
from 0.5-1 wt. % copper,
from 0.1-1 wt. % silver;
from 0.02-0.2 wt % nickel;
and optionally one or more of
from 0.02-0.3 wt % iron,
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % magnesium,
from 0-0.3 wt. % calcium,
from 0-0.3 wt. % silicon,
from 0-0.3 wt. % aluminium,
from 0-0.3 wt. % zinc,
from 0.008-0.2 wt % manganese,
from 0.01-0.3 wt % cobalt,
from 0.01-0.3 wt % chromium, and
from 0.008-0.1 wt % zirconium;
and balance of tin, together with unavoidable impurities.

36. The alloy of claim 2 consisting essentially of:
from 0.08-0.3 wt. % bismuth,
from 0.5-0.9 wt. % copper,
from 0.1-0.5 wt. % silver;
from 0.02-0.1 wt % nickel;
and optionally one or more of
from 0.02-0.3 wt % iron,
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % magnesium,
from 0-0.3 wt. % calcium,
from 0-0.3 wt. % silicon,
from 0-0.3 wt. % aluminium,
from 0-0.3 wt. % zinc,
from 0.008-0.2 wt % manganese,
from 0.01-0.3 wt % cobalt,
from 0.01-0.3 wt % chromium, and
from 0.008-0.1 wt % zirconium;
and balance of tin, together with unavoidable impurities.

37. The alloy of claim 2 consisting of:
from 0.08-0.3 wt. % bismuth,
from 0.5-0.9 wt. % copper,
from 0.1-0.5 wt. % silver;
from 0.02-0.1 wt % nickel;
and balance of tin, together with unavoidable impurities.

38. The alloy of claim 1 wherein the Bi content does not exceed 0.5 wt %.

39. The alloy of claim 1 wherein the Bi content does not exceed 0.4 wt %.

40. The alloy of claim 1 wherein the Bi content does not exceed 0.3 wt %.

41. A soldered joint comprising the alloy of claim 1.

42. A lead-free alloy for use in an application selected from the applications consisting of a wave solder process, a reflow soldering process, a hot air levelling process, a ball grid array, and a chip scale package, the alloy comprising:
from 0.08-1 wt. % bismuth,
from 0.15-1.5 wt. % copper,
from 0.1-1.1 wt. % silver;
from 0.005 to 0.3 wt % magnesium;
one or both of
from 0.02-0.3 wt % nickel and/or
from 0.02-0.3 wt % iron;
and optionally one or more of
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % calcium,
from 0-0.3 wt. % silicon,
from 0-0.3 wt. % aluminium,
from 0-0.3 wt. % zinc,
from 0.008-0.2 wt % manganese,
from 0.01-0.3 wt % cobalt,
from 0.01-0.3 wt % chromium, and
from 0.008-0.1 wt % zirconium;
and balance of tin, together with unavoidable impurities.

43. A lead-free alloy for use in an application selected from the applications consisting of a wave solder process, a reflow soldering process, a hot air levelling process, a ball grid array, and a chip scale package, the alloy comprising:
from 0.08-1 wt. % bismuth,
from 0.15-1.5 wt. % copper,
from 0.1-1.1 wt. % silver;
from 0.01 to 0.3 wt. % calcium;
one or both of
from 0.02-0.3 wt % nickel and/or
from 0.02-0.3 wt % iron;
and optionally one or more of
from 0-0.1 wt. % phosphorus,
from 0-0.1 wt. % germanium,
from 0-0.1 wt. % gallium,
from 0-0.3 wt. % of one or more rare earth elements,
from 0-0.3 wt. % indium,
from 0-0.3 wt. % magnesium,
from 0-0.3 wt. % calcium,
from 0-0.3 wt. % silicon,
from 0-0.3 wt. % aluminium,
from 0-0.3 wt. % zinc,
from 0.008-0.2 wt % manganese,
from 0.01-0.3 wt % cobalt,
from 0.01-0.3 wt % chromium, and
from 0.008-0.1 wt % zirconium;
and balance of tin, together with unavoidable impurities.

* * * * *